US008645008B2

(12) United States Patent
Muensterer

(10) Patent No.: US 8,645,008 B2
(45) Date of Patent: Feb. 4, 2014

(54) METHOD FOR PRESENTING THE DRIFT VALUES OF AN AIRCRAFT

(75) Inventor: Thomas Muensterer, Tettnang (DE)

(73) Assignee: EADS Deutschland GmbH, Ottobrunn (DE)

( * ) Notice: Subject to any disclaimer, the term of this patent is extended or adjusted under 35 U.S.C. 154(b) by 0 days.

(21) Appl. No.: 13/823,839

(22) PCT Filed: Sep. 30, 2011

(86) PCT No.: PCT/DE2011/001791
§ 371 (c)(1),
(2), (4) Date: May 21, 2013

(87) PCT Pub. No.: WO2012/051986
PCT Pub. Date: Apr. 26, 2012

(65) Prior Publication Data
US 2013/0226370 A1 Aug. 29, 2013

(30) Foreign Application Priority Data

Oct. 21, 2010 (DE) .......................... 10 2010 049 175

(51) Int. Cl.
*G01S 13/92* (2006.01)
*G01C 23/00* (2006.01)
*G02B 27/01* (2006.01)
*G08G 5/00* (2006.01)

(52) U.S. Cl.
CPC ................ *G01S 13/92* (2013.01); *G01C 23/00* (2013.01); *G08G 5/0095* (2013.01); *G02B 27/01* (2013.01)
USPC ............... 701/3; 701/1; 701/4; 701/7; 701/8; 701/16; 340/945; 340/946; 340/971; 340/973; 340/974; 340/975; 340/977; 340/978; 340/979; 340/980; 244/17.11; 345/7; 345/8; 345/9; 73/178 H; 73/178 T; 359/630

(58) Field of Classification Search
CPC .................................. G01S 13/92; G01S 13/93
See application file for complete search history.

(56) References Cited

U.S. PATENT DOCUMENTS 3,609,299 A * 9/1971 Wright ...................... 235/61 NV
3,825,180 A * 7/1974 Gallagher .................. 235/78 R
(Continued)

FOREIGN PATENT DOCUMENTS

DE 10 2007 014 015 A1 9/2008
WO WO 2006/132713 A2 12/2006

OTHER PUBLICATIONS

Donley, Shawn T., and Theodor A. Dukes. Helmet mounted display symbology for helicopter landing on small ships. Naval Air Development Center WarminsterPA, 1981., p. 224, nonlinear scaling in final approach phase; specifically, quadratic scaling.*

(Continued)

*Primary Examiner* — John Q Nguyen
*Assistant Examiner* — Edward Torchinsky
(74) *Attorney, Agent, or Firm* — Crowell & Moring LLP

(57) ABSTRACT

A method for presenting the current drift values of an aircraft on a display device in which the drift values are presented in a vector presentation. The length of the drift vector above a predefined threshold value is presented in a manner proportional to the current drift velocity, and the length of the drift vector below the threshold value is presented in a manner disproportionate to the current drift velocity. There is a continuous transition between the two ways of presentation at the threshold value.

4 Claims, 4 Drawing Sheets

(56) References Cited

U.S. PATENT DOCUMENTS

| | | | |
|---|---|---|---|
| 4,120,091 A * | 10/1978 | Borgato | 33/1 SB |
| 7,091,881 B2 * | 8/2006 | Judge et al. | 340/979 |
| 7,928,862 B1 * | 4/2011 | Matthews | 340/946 |
| 2006/0238377 A1 | 10/2006 | Stiles et al. | |
| 2009/0140885 A1 | 6/2009 | Rogers et al. | |

OTHER PUBLICATIONS

International Search Report dated Feb. 1, 2012 with English translation (Four (4) pages).

* cited by examiner

METHOD FOR PRESENTING THE DRIFT VALUES OF AN AIRCRAFT

BACKGROUND AND SUMMARY OF THE INVENTION

Exemplary embodiments of the present invention relate to a method for representing the drift values of an aircraft with the drift values being represented in a vector representation.

During a non-autonomous, sensor-assisted helicopter landing in restricted viewing conditions, for example brown-out or whiteout conditions, the pilot must be presented with an easily detectable, unique representation of the drift direction and drift speed of the helicopter above the ground. The implementation of such symbols in an HMI (Human-Machine Interface) is performed either on a head-down display (multifunctional display MFD), on a head-up display (HUD) or a helmet-mounted sight display (HMS/D). The common practice is to represent the drift velocity by a so-called drift vector (reference 1, FIG. 1), that is to say a line (with or without representation of the start point and endpoint) starting from a fixed endpoint (typically the center of the area represented), the length of the line being directly proportional to the instantaneous drift speed, and its direction specifying the instantaneous drift direction (see, for example, Szoboszlay, Z. et al., "Brown-Out Symbology Simulation (BOSS) on the NASA Ames Vertical Motion Simulator," American Helicopter Society 64$^{th}$ Annual Forum, 2008).

The value range to be represented for the drift speed above ground in the landing phase is typically very large. A typical display range for landing helicopters is between 30 and 0 knots (kts). The problem that results therefrom for the above-described, proportional representation is that the HMI of the drift display must, on the one hand, represent the smallest lateral drifts during landing in a clearly detectable fashion, since these are classified as highly critical from the point of view of flight permission (the critical maximum value of the lateral drift is, for instance, 0.4 kts for a type CH53 helicopter), and, on the other hand, the display resolution of the display device is physically limited, and this restricts the representational length of the drift vector in terms of hardware. Thus, for typical HMI visualization concepts for the representation of the drift vector on conventional MFDs, the representation of a safety-critical drift value of 0.4 kts is done with a length of less than 5 pixels.

It is apparent that the pilot is no longer able to optically resolve the length and, in some cases, also the direction of the drift vector in the case of small drift values such as occur typically during landing in a reliable way on the display.

Exemplary embodiments of the present invention provide a method for representing the drift vector that produces a representation the pilot can easily detect even small drift values without the need to reduce the quality of the representation at higher drift values.

In accordance with exemplary embodiments of the present invention, for drift speeds below a prescribed threshold value a scaled representation of the drift vector length is provided that deviates from the known, purely proportional relationship between current drift velocity and the associated representation of length of the drift vector in the display device, specifically in such a way that the drift values below the threshold value are illustrated as extended in length (by comparison with the proportional representation). By contrast, the conventional proportional representation is adhered to in the speed range above the threshold value. A continuous transition is ensured between the two ways of representation, and so jumps in the representation are avoided.

It is advantageously possible to use a logarithmized representation.

The inventive method provides good visibility of the drift vector over the entire value range to be represented and, particularly in the case of small drift values. In particular, there is no need for a manual switching over between different resolutions of the display, or for the use of a plurality of display devices. It is therefore possible to make a substantial contribution to a risk-free, safe landing.

BRIEF DESCRIPTION OF THE DRAWING FIGURES

The invention is explained in more detail with the aid of examples and with reference to figures, in which.

DETAILED DESCRIPTION

FIG. 1a shows a schematic representation of the drift vector in accordance with the prior art. The drift of the helicopter above ground is represented with the aid of a drift vector 1. The length specifies the absolute value of the speed above ground. The direction of the vector 1 specifies the direction of the drift above ground in relation to the helicopter longitudinal axis (typically an upward deflection of the vector represents a forward drift here). The reference circle 10 allows for the judgment of the relative length of the velocity vector 1 and corresponds in this example to a drift speed of 15 kts. It can also be taken only implicitly as a boundary of the display range and is not depicted in this case.

Figure 1:
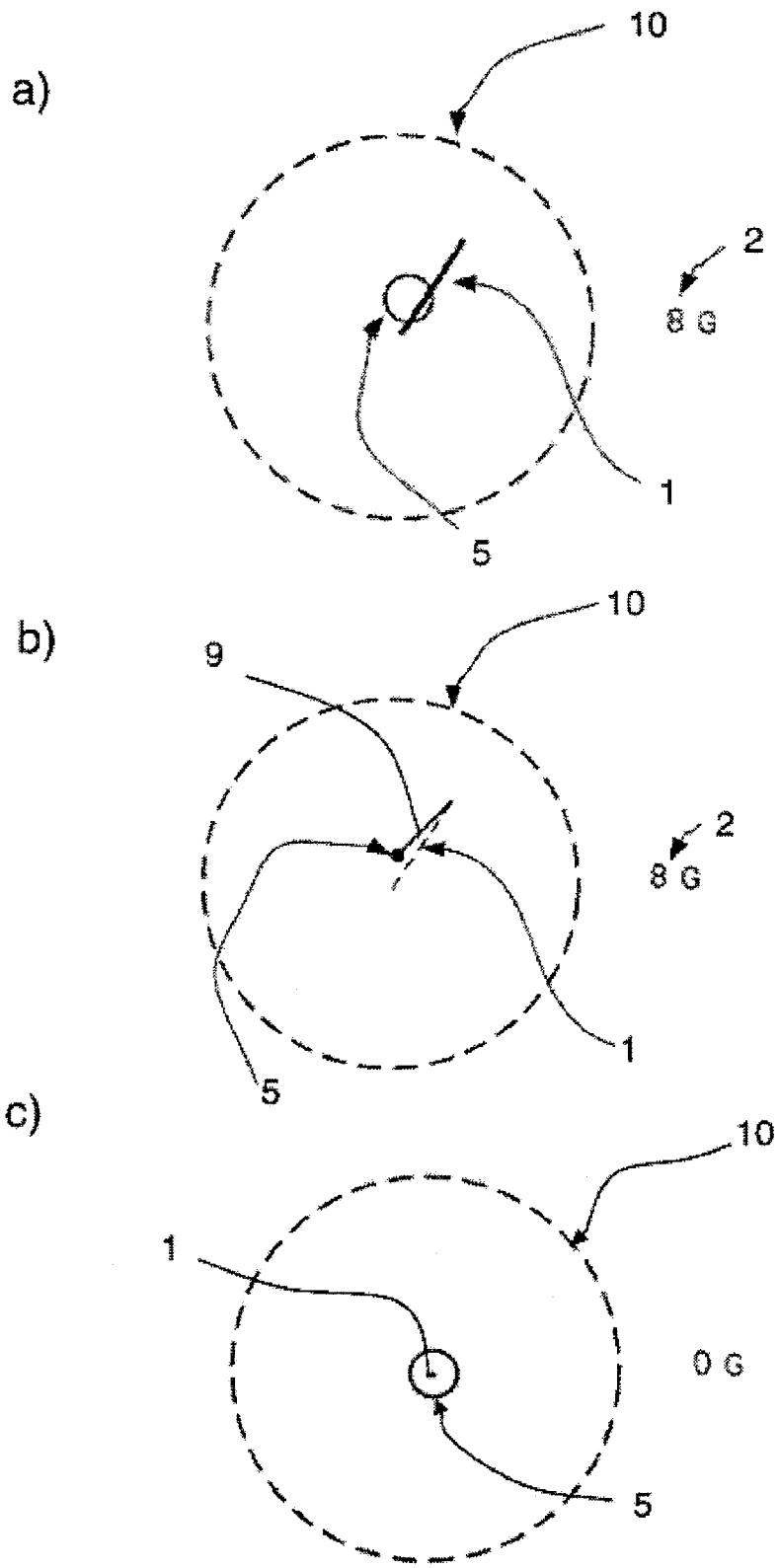
FIG. 1 shows two display methods in accordance with the prior art.

In addition, modern sensor-assisted landing aids are able to display a predicted value of the drift (acceleration cue), designed in FIGS. 1a and 1c in the form of a circle 5 whose center specifies where the tip of the drift vector 1 is located in a fixed time difference (typically three to four seconds) given constant acceleration. In addition, FIG. 1 specifies the absolute value 2 of the speed above ground on the relevant display device, in each case also numerically (here, 8 kts obliquely forward to the right).

Other prior art representations of drift are illustrated in FIG. 1b (see, for example, A. J. C. de Reus, M. van Witzenburg, "Pilot-in-the-loop evaluation of a novel acceleration symbol for the RNLAF AS-532 U2 Cougar helicopter HUD" in the report NLR-TP-2007-757 of the National Aerospace Laboratory NLR, Netherlands, November 2007). The drift vector 1 is represented here only indirectly as startpoint of a vector 9 that connects the tip of the drift vector (which otherwise is not represented at all) to the acceleration cue 5 (here in the form of a filled out circle). Since the drift vector 1 results only implicitly from the representation of the vector 9, it is illustrated by dashes in FIG. 1b.

FIG. 1c shows the same method of representation as FIG. 1a, but in this case for a relatively small drift value near zero. The drift vector represented is correspondingly very small. In this situation, it is very difficult for the pilot to detect whether a lateral drift exists, and whether it lies below or above the permissible maximum value (for example 0.4 kts) for a landing. Depending on whether a zero point reference, that is to say an origin of the drift vector, is indicated, it is also impossible to detect the direction of the existing drift uniquely and quickly for correction measures. An illustrated zero point reference would, on the other hand, cover the still present residual length of the drift vector.

Figure 2:
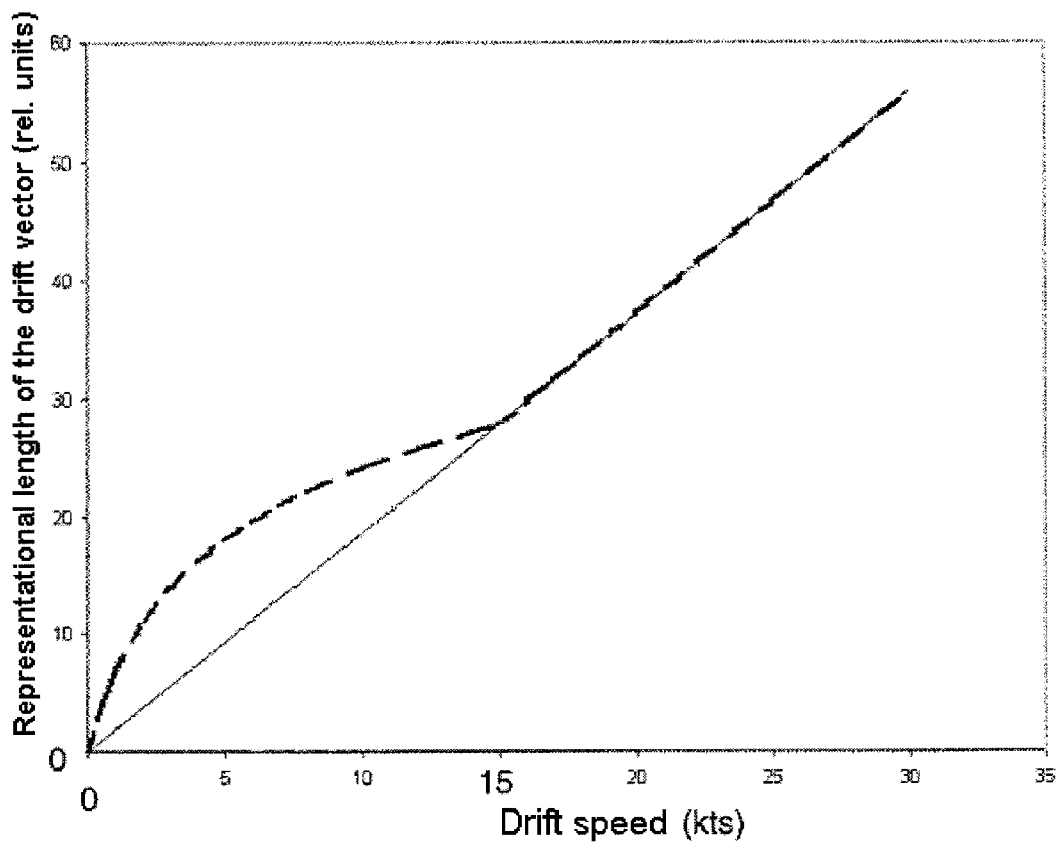
FIG. 2 shows the representation of the relationship between current drift speed and associated representation of length of the drift vector in accordance with the invention.

FIG. 2 illustrates the inventive solution. It represents the relationship between the drift speed (horizontal axis) and the illustrated length of the drift vector in a display device (vertical axis).

Above a prescribed threshold value of the drift speed (here at 15 kts), the representation is linear. Below the threshold value, there is a deviation from the proportional representation that relates to the extension of the represented vector (by comparison with the proportional representation). A logarithmic relationship is selected in the example shown.

The two curves segments merge into one another continuously, which avoids jumps at the transition. As may likewise be seen from FIG. 2, the represented vector length comprises 0 pixels when the drift speed is equal to 0 kts.

In the segment below the threshold value, the following relationship is particularly suitable for representing the drift vector:

$$d_v = \frac{\log(v + 1[\text{kt}])}{\log 16[\text{kt}]} \cdot d_{15kt}$$

with the transition between linear and scaled (here: logarithmic) representation being selected at 15 kts. Here, $d_v$ is the length, newly to be represented, of the drift vector, $d_{15kt}$ is the length of the drift vector for a linear representation at the transition point 15 kts, and V is the speed to be represented in knots. This formula satisfies the requirements set forth above on the continuity of the transition (here at 15 kts) and on the vanishing length at 0 kts.

In addition, it is also possible to provide an optical warning, or emphasis of the drift vector upon overshooting of the lateral drift permitted for a landing. This can be done by flashing (for example for monochromatic HMS/Ds) or/and by colored emphasis (red drift vector) on polychromatic display media.

Alternatively, the undershooting of the permissible maximum lateral drift can also be displayed by the complete drift vector, or else its lateral component vanishing. That is to say, the drift vector disappears from the display medium when a landing has no forward and lateral drift. In the case of a landing with planned forward drift, all that is still displayed as drift vector is a line aligned exactly forward.

The predicted value (acceleration cue) for the drift speed is advantageously displayed according to the same principles as for the current drift vector as described above. Specifically, the distance of the acceleration cue 5 from the origin of the display is performed according to the relationship illustrated in FIG. 2, for example.

Figure 3:
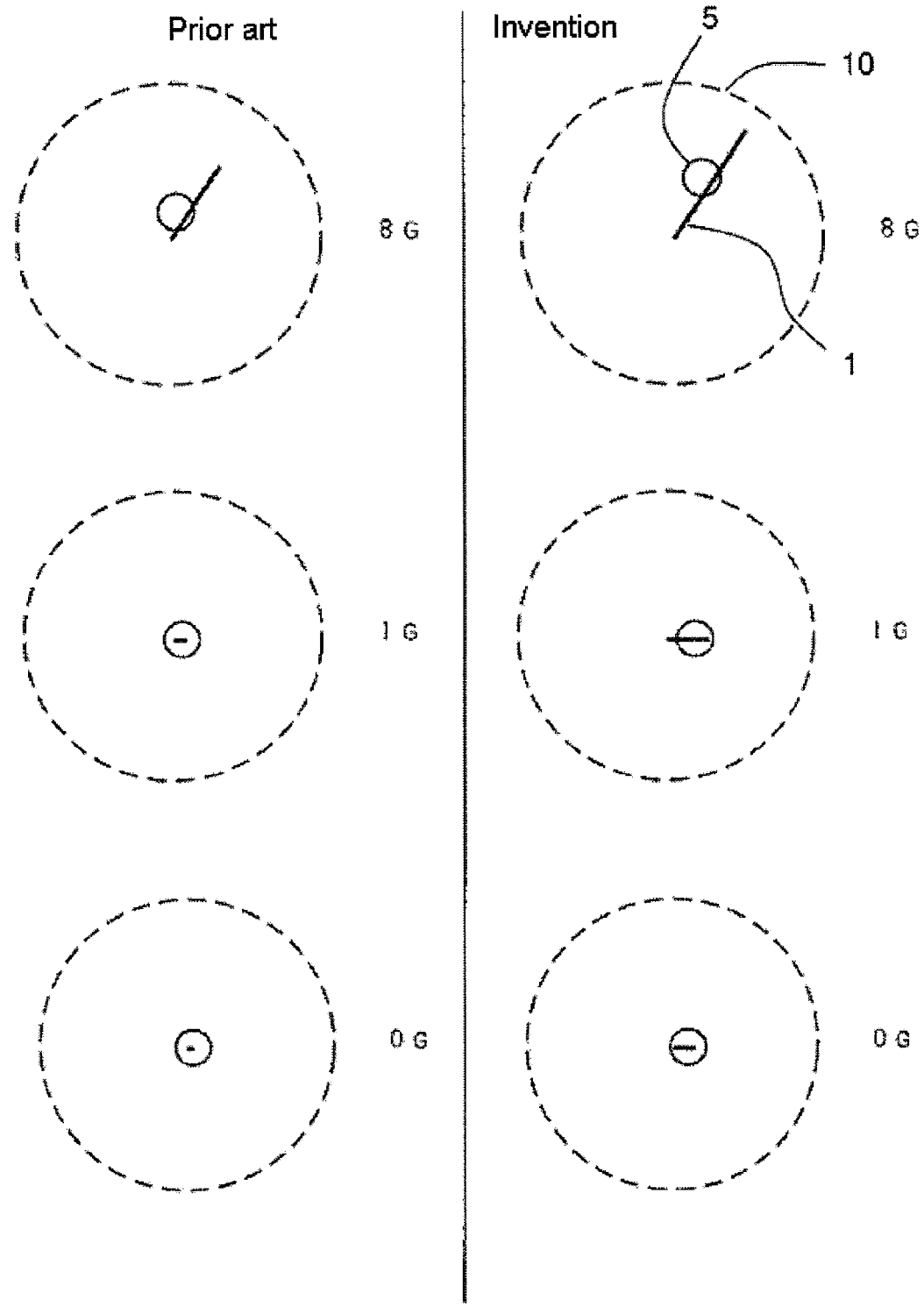
FIG. 3 shows the inventive representation method in comparison with the known display method according to figures 1a, c for three different drift values.

In the example according to FIG. 3 the drift vector is represented explicitly by a line between the fixed origin of the display and its endpoint (being similar to the method according to FIGS. 1a, c to this extent). Of course, the inventive method can also be combined with an implicit display (FIG. 1b) of the drift vector. In this case, a vector is displayed from the endpoint of the drift vector to the acceleration cue, while the drift vector itself is not illustrated at all. The drift vector therefore results only indirectly from the startpoint of this displayed vector.

The inventive solution provides a substantial improvement in the perception of the drift vector in the range of low drift speeds. The examples in FIG. 3 are intended to illustrate this. FIG. 3 shows displays for drift speeds of 8 kts, 1 kts and 0.4 kts drift. The known HMI symbols are shown respectively on the left with the linear display of the drift vector 1, and on the right is shown the inventive solution corresponding thereto (respectively with superimposed predicted value 5 (acceleration cue)). The reference circle 10 is again selected at 15 kts.

All three drift speeds displayed are in the logarithmic segment of the illustration according to FIG. 2. As early as at 8 kts, an improvement is to be seen by comparison with the conventional display, in which the velocity vector is clearly visibly extended. In the case of the very small drift speeds of 1 and 0.4 kts, the pilot is scarcely still able to extract reliable information in the case of the conventional display, while the inventive display still allows clear perception with regard to the length of the velocity vector 1 and position of the associated acceleration cue 5.

Figure 4:
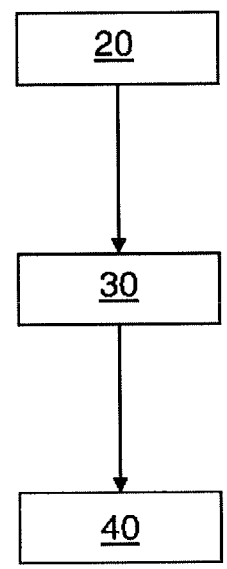
FIG. 4 shows a hardware design for implementing the method according to the invention.

FIG. 4 shows the block diagram relating to a possible hardware implementation of the inventive method. Reference number 20 denotes a sensor for determining the horizontal speed of the helicopter, typically a GPS-coupled inertial navigation device. The sensor value obtained is transmitted to a microprocessor 30 that carries out a comparison with the threshold value in order to distinguish between the two display principles. Depending on whether the sensor value is above or below the threshold value, the length of the drift vector to be displayed is calculated according to one of the two relationships, that is to say linearly or logarithmically, and passed on to the display 40 to be displayed.

The display 40 can be, in particular, a Head-Down Display (multifunctional display MFD), a Head-Up Display (HUD) or a Helmet-Mounted Sight Display (HMS/D).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for representing current drift values of an aircraft on a display device, the drift values being represented as vectors, the method comprising:
   determining, by a processor, whether a current drift velocity of the aircraft is above or below a predetermined threshold value;
   displaying a length of a drift vector proportional to the current drift velocity when the current drift velocity is above the predetermined threshold value; and
   displaying the length of the drift factor overproportionately to the current drift velocity when the current drift velocity is below the predetermined threshold value,
   wherein there is a continuous transition in the display of the length of the drift vector at the predetermined threshold value,
   wherein the overproportional relationship between the current drift velocity and the length of the represented drift vector is logarithmic.

2. The method as claimed in claim 1, wherein a predicted value for the drift value is superimposed on the display of the current drift vector, wherein the predicted value is represented proportional or overproportionately to the current drift velocity depending upon whether the predicted value is above or below the predetermined threshold value.

3. The method as claimed in claim 2, wherein the display of the drift vector or the display of predicted value is performed by representing only an endpoint of the vector with reference to a fixed start point.

4. The method as claimed in claim 3, wherein a vector defined by the endpoints of drift vector and predicted value is displayed.

* * * * *